UNITED STATES PATENT OFFICE.

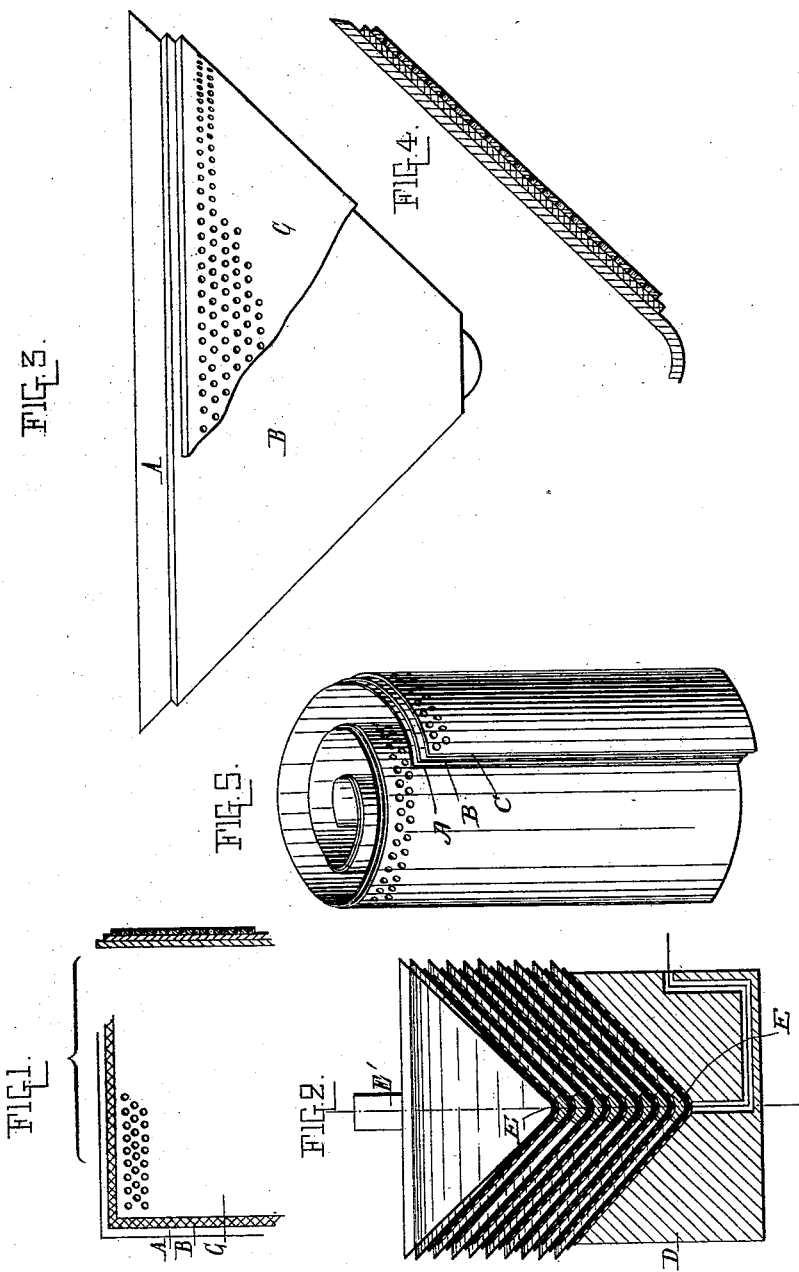

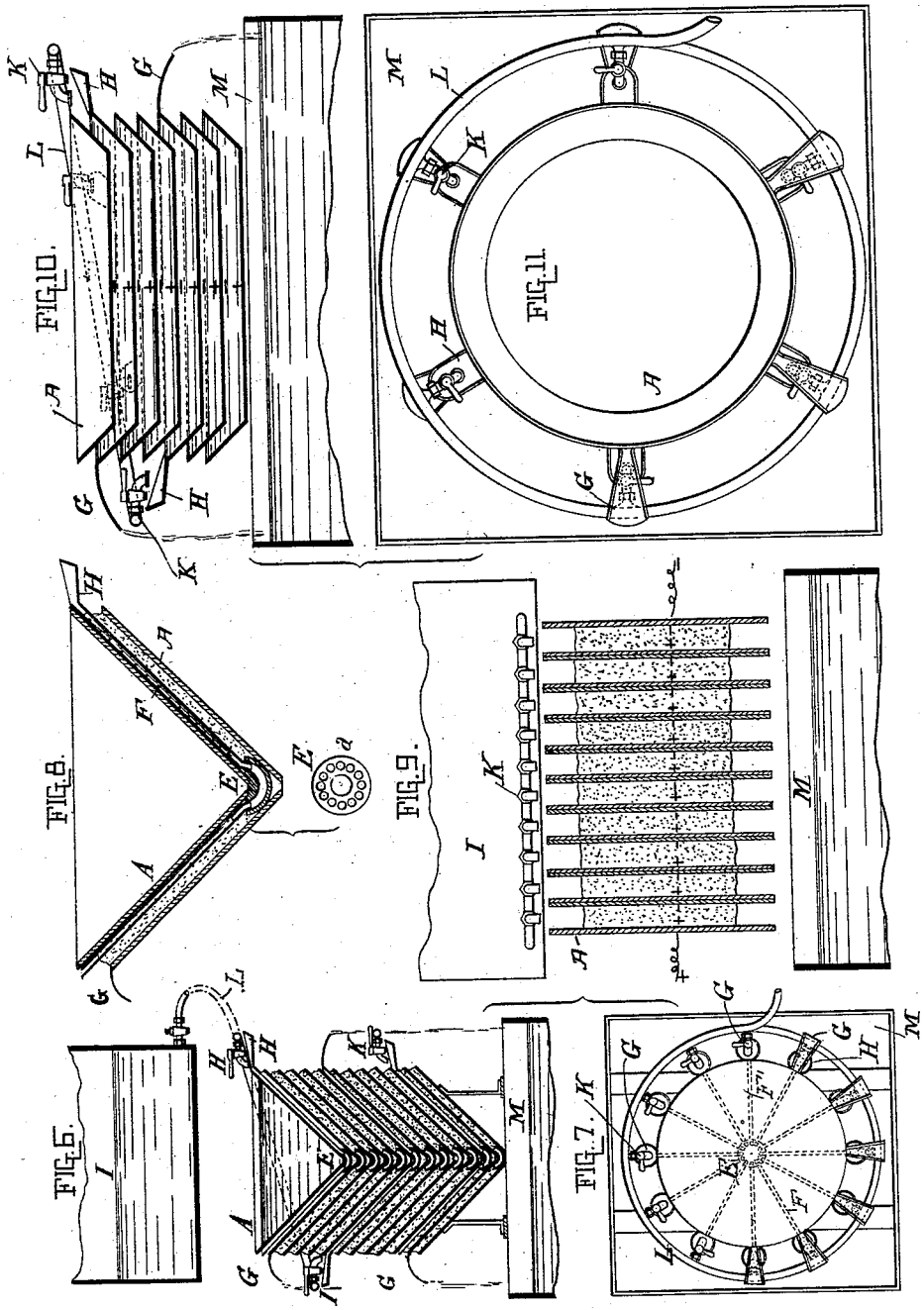

GUSTAVE PHILIPPART, OF PARIS, FRANCE.

SECONDARY BATTERY.

SPECIFICATION forming part of Letters Patent No. 425,902, dated April 15, 1890.

Application filed January 6, 1890. Serial No. 336,060. (No model.) Patented in France January 26, 1889, No. 195,658; in Belgium January 28, 1889, No. 84,798; in England January 30, 1889, No. 1,673, and in Germany February 1, 1889, No. 49,356.

*To all whom it may concern:*

Be it known that I, GUSTAVE PHILIPPART, a citizen of Belgium, residing at Paris, France, have invented certain new and useful Improvements in Electric Storage-Batteries or Accumulators, (for which Letters Patent have been obtained in France, No. 195,658, dated January 26, 1889; in Belgium, No. 84,798, dated January 28, 1889; in Great Britain, No. 1,673, dated January 30, 1889, and in Germany, No. 49,356, dated February 1, 1889,) of which the following specification is a clear, full, and exact description.

This invention has for its object, first, to retain the active material most perfectly on the supports therefor; second, to provide a liquid of uniform density; third, to obtain depolarization by circulation of the liquid, and, fourth, to provide a new or improved kind of support for the active material.

In most storage-batteries or accumulators of the class which may be called "heterogeneous"—that is to say, which have the active material applied as a paste to the electrodes—the active material is apt to detach itself from the supports therefor and to fall in a form like that of soot to the bottom of the containing-vessel. Among the dispositions which have been employed one consists in maintaining the active material (such as sulphate and oxides of lead) in paste against the supports by means of a suitable tissue or fabric. With this arrangement on account of the very small duration of the tissue the disaggregation and fall of the paste which becomes separated from its supports take place, as already stated. According to the present invention this vary grave inconvenience is remedied in the following way: The electrode is composed, essentially, of a very homogenous plate of lead or lead alloy, the plate being to this end compressed strongly by suitable means or obtained by casting under pressure. These plates serve as supports for the active material. This latter (consisting of sulphate of lead, oxides of lead, reduced lead, &c.) is mixed and diluted with glycerine or glucose or other liquid of the same class, so as to form a paste of proper fluidity, and the paste thus prepared is placed on any suitable tissue or fabric—such as felt, flannel, asbestus fabric, rubber fabric, &c.—and the whole is compressed under strong pressure, so that the paste penetrates the meshes or interstices of the fabric, becomes completely incorporated therein, and forms therewith one inseparable whole. The fabric thus prepared is applied to the supporting-plate and the whole subjected to pressure in a press or between cylinders in such manner that after the operation the fabric cannot be detached. Moreover, to assure still more completely the adhesion of the fabric impregnated with active material, it may in certain cases, if considered useful, be covered with a third plate of inert material, such as celluloid. This plate is perforated with a large number of holes disposed in such form that the liquid of the accumulator can penetrate the fabric in the best manner and come into contact with the active material. This celluloid plate is compressed at the same time as the plate of lead or lead alloy and the fabric in such manner that the electrode presents itself under the form of a simple plate composed in reality of three thicknesses—namely, the support of compressed lead or lead alloy, the fabric impregnated with active material, and the perforated celluloid.

In practice I can make the accumulators with electrodes constructed, as just described, of various forms and arrangements, some of which I will now describe.

In the accompanying drawings, which form part of this specification, Figure 1 represents a plate-electrode constructed in accordance with the invention, the left of the figure being a partial view in elevation and the right a partial view in section of such electrode. Fig. 2 is a vertical section of an accumulator with conical or cupped electrodes. Figs. 3 and 4 are detail views of one of the conical or cupped electrodes. Fig. 5 is a perspective view of a spiral electrode. Figs. 6, 7, and 8 are views of an accumulator with conical electrodes provided with a reservoir for supplying liquid to the cells and means for causing a flow of the liquid through the same. Fig. 9 is a view of an accumulator with plate-electrodes provided with a reservoir, and Figs. 10 and 11 are views of an accumulator with dish or tray shaped electrodes.

As hereinafter stated, the electrodes are constituted by a support A, Fig. 1, of lead or lead alloy compressed or obtained by casting under pressure, so as to obtain a very homogeneous metal, a sheet of fabric B, impregnated with active material, and a perforated sheet of celluloid C. The making of the supports of compressed metal is of great importance, for if the supports of lead or alloy obtained simply by ordinary casting are employed they become rapidly perforated, which is inconvenient, particularly for cupped or dished electrodes.

It has already been proposed, in order to simplify secondary or storage batteries, to dispose their elements like those of the old trough-batteries and to construct accumulators with parallel electrodes. In the same line of ideas I have myself devised accumulators composed of cones of lead or alloy nested together and separated from one another by means of wedges and rods of variable thickness. Into the space which exists between two consecutive cones the liquid necessary to the operation of the accumulator is introduced, and as many elements in tension are thus obtained as there are cones, less one. The exterior surfaces of these cones were provided with grooves of suitable form designed to hold the active material. Each cone is thus at the same time the positive electrode of the preceding and the negative electrode of the succeeding couple. This sytem of accumulators presents certain advantages; but it does not possess at all the necessary durability, since the cones of simply cast lead deteriorate rapidly, and, once perforated, become useless. Moreover, the retention of the active material in the grooves with which the electrodes were provided was not sufficiently assured. This last difficulty is the most important of all, and I obviate it by the present invention.

The accumulators with conical or cupped elements which I now make are formed by cones of lead or lead alloy A, Figs. 3 and 4; but these, in place of being obtained by casting, are obtained by embossing either in the lathe or in special presses or by casting under pressure. This first improvement avoids the perforation of the electrode, which so soon becomes noticeable with cones of cast lead.

In the second place for applying the active material on the supports I make cones B of any suitable fabric, (felt, flannel, rubber fabric, asbestus fabric, &c.,) which I impregnate by pressure, as already stated, with active material, (sulphate of lead, oxides of lead, reduced lead, &c.,) this material being suitably mixed with glycerine or analogous liquid. These fabric cones B are then applied over the lead cones A, whose surfaces are almost entirely covered thereby. I thus obtain conical electrodes positive on one face and negative on the other, on which the active material is maintained without danger of its falling off or becoming detached. For a more complete assurance of the adhesion of the fabric cones these may (if thought useful) be covered with a third cone C of perforated celluloid. The three cones of lead, of fabric impregnated with active material, and of perforated celluloid are pressed mechanically against each other in such manner that there is an absolute adhesion.

The conical electrodes are nested together with insulating wedges or strips interposed, so as to leave a space for the exciting-liquid between. Preferably the apex of each cone rests in a recessed block E, in which are inserted the lower ends of rods that extend upward between the electrodes, as at F, Fig. 8.

The bottom cone serves as the negative pole. It is placed in a block D, which upholds the series. The top cone only contains liquid. It receives a cone of lead provided with an ear E', which constitutes the positive pole of the accumulator.

Secondary batteries of this kind may be of any desired size and dimensions, and I may make them a meter and a half in diameter and upward. Necessarily such accumulators would be employed at fixed stations, and in that case to diminish the attention necessary to keep up the supply of liquid, which tends always to evaporate more or less, recourse may be had to the simple expedient of placing the accumulator in a tight metal envelope; also, to diminish the attendance reservoirs containing the proper liquid may be arranged to supply the same through proper conduits to each compartment of the accumulator as it disappears by evaporation.

The electrodes just described are appropriate to fixed stations. I have provided another type of accumulators which can be employed for traction, it being constructed on the same principles as the preceding. The electrodes of this type comprise always a plate of lead or lead alloy compressed or cast under pressure, against which is applied a fabric impregnated with active material, the whole being covered, if need be, with a perforated plate of celluloid.

In the arrangement shown in Figs. 6, 7, and 8 the blocks E are hollow and are provided with a number of holes a, and one of the rods F is itself perforated longitudinally. At the edge of the cone is an overflow G in the form of a spout. Each cone is provided with its receiver H at the upper end of the hollow rod F and with its overflow G.

From a reservoir I, placed above the accumulator, extends a tube L, which distributes the liquid to each cone A through an appropriate stop-cock K, which allows the acidulated liquid to fall drop by drop into the corresponding receiver H. This is very important, for if the stop-cock were opened too full the elements might be put into electrical communication with each other through the stream of liquid. The receivers H are placed in front of the helicoidal pipe L, which is provided with the stop-cocks K. The spouts of the overflows G are placed not directly under each other, but to one side, so that there is no liability of the elements becoming electrically connected by the liquid which should escape drop by drop by the overflow as it enters by the receiver.

The operation is as follows: The acidulated water arriving by the distributing stop-cocks K enters the small conduits F, which conduct it into the blocks E, provided with holes. The liquid which rises along the walls of the cones A overflows drop by drop and falls into a reservoir M under the accumulator. This liquid is raised into the reservoir I by a pump or by other mechanical means.

My improvements are also applicable to accumulators with vertical plates or to ordinary box-accumulators, or to accumulators with dish or tray shaped elements. In Fig. 9 the reservoir I has stop-cocks K, which allow the exciting-liquid to drip into the space between the electrodes, the excess of liquid collecting in the reservoir M.

In Figs. 10 and 11 there is a helicoidal pipe L, with stop-cocks K, and each disk or tray A has a receiver H and an overflow-spout G. M is the reservoir under the accumulator.

I claim as my discovery or invention—

1. In the art of constructing secondary-battery elements, the improvement consisting in impregnating a sheet of fabric with a mixture of active material and glycerine or other liquid by compression and applying the sheet thus impregnated to a conducting-support, substantially as described.

2. In the art of constructing secondary-battery elements, the improvement consisting in subjecting lead or other suitable metal to pressure to form a conducting-support, applying thereto a sheet of fabric impregnated with active material, and uniting the two by compression, substantially as described.

3. In the art of constructing secondary-battery elements, the improvement consisting in applying to a conducting-support a layer of fabric impregnated with active material, covering the same with a perforated sheet of neutral material, and uniting the three thicknesses by compression, substantially as described.

4. A secondary-battery element composed of a conducting-support of lead or like material, a perforated sheet of celluloid or other neutral substance, and an intermediate layer of fabric impregnated with active material, substantially as described.

5. The combination, with a series of cupped or dished electrodes provided with overflows, of the distributing-pipe and cocks, substantially as described.

6. The combination, with a series of cupped or dished electrodes, of hollow supporting-blocks and the conduits extending from the edges of the electrodes to the interior of said blocks, substantially as described.

In testimony whereof I have signed this specification in the presence of two subscribing witnesses.

GUSTAVE PHILIPPART.

Witnesses:
PAUL GIRALZ,
J. L. RATHBONE.